(12) United States Patent
Pandey

(10) Patent No.: US 8,869,196 B2
(45) Date of Patent: Oct. 21, 2014

(54) PROGRAMMING BASED INTERACTIVE CONTENT

(75) Inventor: Siddharth Pandey, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 19 days.

(21) Appl. No.: 13/412,818

(22) Filed: Mar. 6, 2012

(65) Prior Publication Data

US 2013/0132999 A1    May 23, 2013

Related U.S. Application Data

(60) Provisional application No. 61/561,602, filed on Nov. 18, 2011.

(51) Int. Cl.

| | |
|---|---|
| *H04N 7/10* | (2006.01) |
| *H04N 21/81* | (2011.01) |
| *H04N 21/422* | (2011.01) |
| *H04N 21/45* | (2011.01) |
| *H04N 21/658* | (2011.01) |
| *H04N 21/426* | (2011.01) |
| *H04N 21/431* | (2011.01) |

(52) U.S. Cl.
CPC ....... *H04N 21/4221* (2013.01); *H04N 21/8173* (2013.01); *H04N 21/4532* (2013.01); *H04N 21/6582* (2013.01); *H04N 21/42684* (2013.01); *H04N 21/4524* (2013.01); *H04N 21/4312* (2013.01)

USPC .................................. 725/34; 725/35; 709/219

(58) Field of Classification Search
USPC ............... 725/78–85, 87–118, 37–61, 34, 35; 709/217–232
See application file for complete search history.

(56) References Cited

U.S. PATENT DOCUMENTS

| | | | | |
|---|---|---|---|---|
| 5,929,849 | A * | 7/1999 | Kikinis ........................ | 725/113 |
| 6,282,713 | B1 * | 8/2001 | Kitsukawa et al. ............. | 725/36 |
| 2007/0124779 | A1 * | 5/2007 | Casey et al. ..................... | 725/87 |

* cited by examiner

*Primary Examiner* — Annan Shang

(57) ABSTRACT

A method may include receiving an identification of a device; receiving at least one of device information, which includes a location of the device or a viewing history for the device, or preference information, which includes preferences by a user or a third party, associated with the identification of the device from the device; identifying interactive content based on the at least one of the device information or the preference information; and receiving trigger information, which includes a time and a place for a trigger, the trigger information to identify an event relating to a provisioning of video content. The method may further include mapping the identification of the device and the identified interactive content with the trigger information; detecting that the event has occurred; and sending the identified interactive content based on the mapping and the trigger information.

20 Claims, 11 Drawing Sheets

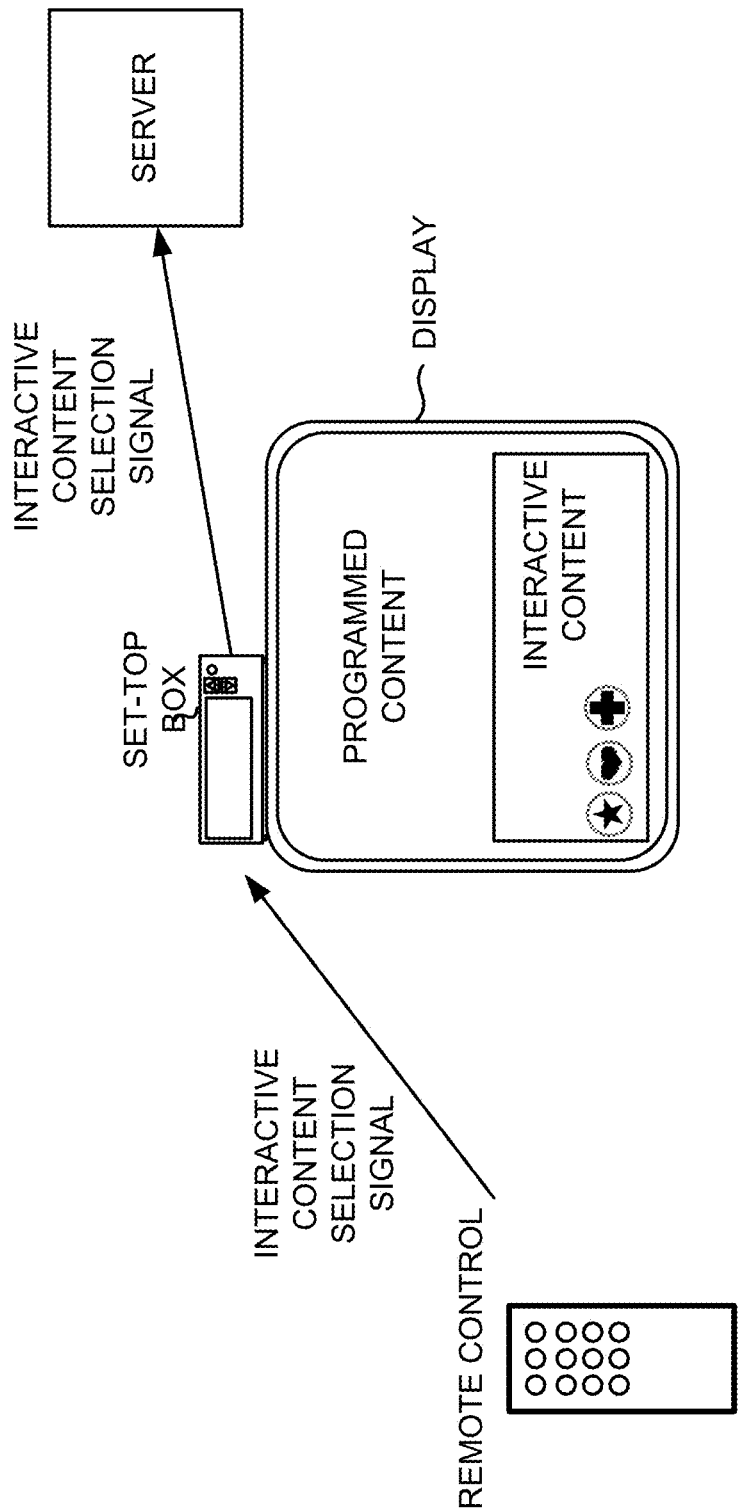

| DIGITAL DEVICE ID 542 | TRIGGER IDENTIFIER 561 | PROGRAMMED CONTENT INFORMATION 562 | INTERACTIVE CONTENT ICON AND DISPLAY 563 | ADDITIONAL CONTENT INFORMATION 564 |
|---|---|---|---|---|
| 123456ABC | 15139 | NATIONAL STORE | NATIONAL AD 565 ➕ | NATIONAL AD 568 |
| 123456ABC | 15139 | NATIONAL STORE | LOCAL AD 566 ★ | LOCAL AD 569 |
| 123456ABC | 15139 | NATIONAL STORE | LOCAL COUPON 567 ● | LOCAL COUPON 570 |
| ID | IDENTIFIER | TYPE | NAME | INFORMATION |
| ... | ... | ... | ... | ... |
| ID | IDENTIFIER | TYPE | NAME | INFORMATION |

FIG. 5C

PROGRAMMING BASED INTERACTIVE CONTENT

RELATED APPLICATION

This application claims priority under 35 U.S.C. §119 based on U.S. Provisional Patent Application No. 61/561,602, filed Nov. 18, 2011, the entire contents of which are hereby incorporated by reference.

BACKGROUND

Live television programs, as well as Digital Video Recorder (DVR) programs and video on-demand programs, can generate revenue through advertising. Advertisements can be provided with the programs in a standard broadcast or stream. Advertisements are shown during pre-scheduled time slots in the programs. Advertisements can be selected based upon the underlying program's target demographics or other general information about the underlying program, but is not selected based upon a particular viewer.

Interactive content for television can be configured for banners, alerts, pop-ups, etc. using industry standard mechanisms, such as Enhanced Binary Interchange Format (EBIF). However, these industry standard mechanisms are part of the television's broadcast stream and are broadcast generally to all viewers as part of the television's broadcast stream. Interactive content for video on-demand and Digital Video Recorder (DVR) shows can also be provided based on a particular channel to all viewers as part of the video on-demand broadcast stream or the recorded DVR broadcast stream.

BRIEF DESCRIPTION OF THE DRAWINGS

FIGS. 1A and 1B are diagrams of an overview of an implementation described herein;

FIGS. 5B and 5C are portions of example data structures that may be associated with one or more components in FIG. 2;

DETAILED DESCRIPTION OF PREFERRED EMBODIMENTS

Figure 1B:
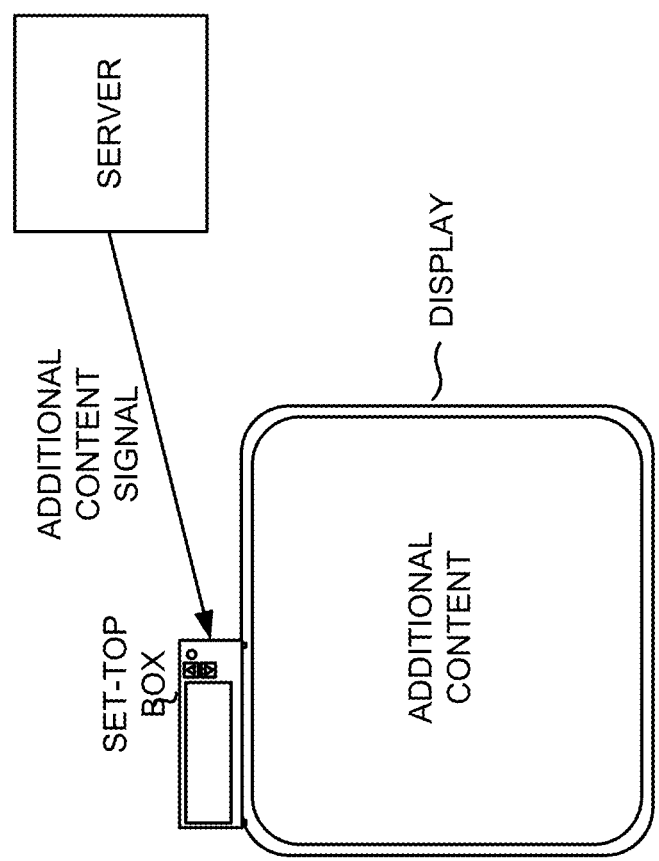

The following detailed description refers to the accompanying drawings. The same reference numbers in different drawings may identify the same or similar elements.

Implementations described herein may provide interactive content and/or additional content via the Internet rather than a broadcast stream. By providing interactive content and/or additional content via the Internet, the interactive content and/or additional content can be customized based upon an identification of digital device, such as a set-top box.

Additionally, or alternatively, by providing content via the Internet, the interactive content can enable a user to supplement or replace programmed content (e.g., content broadcast or streamed to a digital device, such as television shows, commercials, and video on-demand) with additional content by interacting with interactive content to select the additional content. For example, a national advertisement (e.g., the programmed content) can be shown with an interactive menu (e.g., the interactive content) offering a local version of the national advertisement, and if the user selects the local version, then the local version (e.g., the additional content) can replace the national advertisement. As another example, a live television show can be extended by scheduling interactive content based on information about the live television show, such as providing an advertisement for a related video on-demand show that relates to the live television show.

Additionally, or alternatively, the interactive content can be linked to a trigger in the programmed content. In one implementation, the programmed content can have advertisements or other events in the programming that can be triggers causing interactive content to be displayed. For example, at the beginning of a national advertisement (e.g., the programmed content) can be a trigger causing an interactive menu (e.g., the interactive content) to be displayed.

Additionally, or alternatively, the programmed content can be mapped to additional content options, which can be shown as options to select in an interactive content display. For example, a national advertisement (e.g., the programmed content) can be mapped to additional content options, such as a local version of the national advertisement, local coupons relating to the company underlying the national advertisement, and contact information for a local branch of the company underlying the national advertisement (e.g., the additional content options), and these options can be listed in a menu (e.g., the interactive content) for selection by a user.

The mapping of the programmed content to the interactive content and/or the additional content can be provided as internet protocol (IP) mapping. In one implementation, when a trigger occurs in the programmed content, an interactive menu linked to an IP stream of interactive content and/or additional content options can be provided. For example, when a trigger is received, an interactive menu (e.g., the interactive content) and/or supplemental or replacement content (e.g., the additional content) can be provided over an IP stream, which can be separate from the programmed content stream.

FIGS. 1A and 1B are diagrams of an overview of an implementation described herein. FIG. 1A illustrates a user interacting with a set-top box to select additional content to be shown on a display. As illustrated in FIG. 1A, a user can be watching the display, and the display can show a programmed content with interactive content also displayed. The programmed content can be a television show, a video on-demand, a commercial, etc. that is shown as part of a broadcast stream, a video on-demand stream, or the like. The interactive content can be displayed as a response to a trigger that can be identified within the programmed content. For example, a trigger can include any set time or event that can be identified within the broadcast stream, video on-demand stream, etc., such as a start of or the set time for an advertisement. The interactive content to be displayed can include an interactive menu with selectable icons representing additional content that can be displayed along with the commercial. For example, as shown in FIG. 1A, the interactive content can include icons that can be selected using a remote.

As illustrated in FIG. 1A, the user can watch the programmed content and the interactive content, and can select an option from the interactive content using a remote. The remote can send an interactive content selection signal to a set-top box, which can relay the interactive content selection signal to a server. Additionally, or alternatively, the set-top box can receive the interactive content selection signal, and can send an additional content request to the server.

FIG. 1B illustrates the server providing additional content to the set-top box in response to receiving the interactive content selection signal. As illustrated in FIG. 1B, the server can send an additional content signal to the set-top box, and the set-top box can provide the additional content for display on the display. The additional content can include alternative or additional programming that can replace or supplement the programmed content. For example, if the programmed content is a national commercial, then the additional content can include local specials or local contact information for a local branch of the company sponsoring the national commercial. As another example, if the programmed content is a video on-demand, then the additional content can be an advertisement for programming identified as similar to the programmed content. As another example, the additional content can be selected by user preferences for advertisements relating to the user and not necessarily the programmed content. As another example, the additional content can be selected by a service provider or other party arbitrarily or using user or programmed content information to select the additional content.

Figure 2:
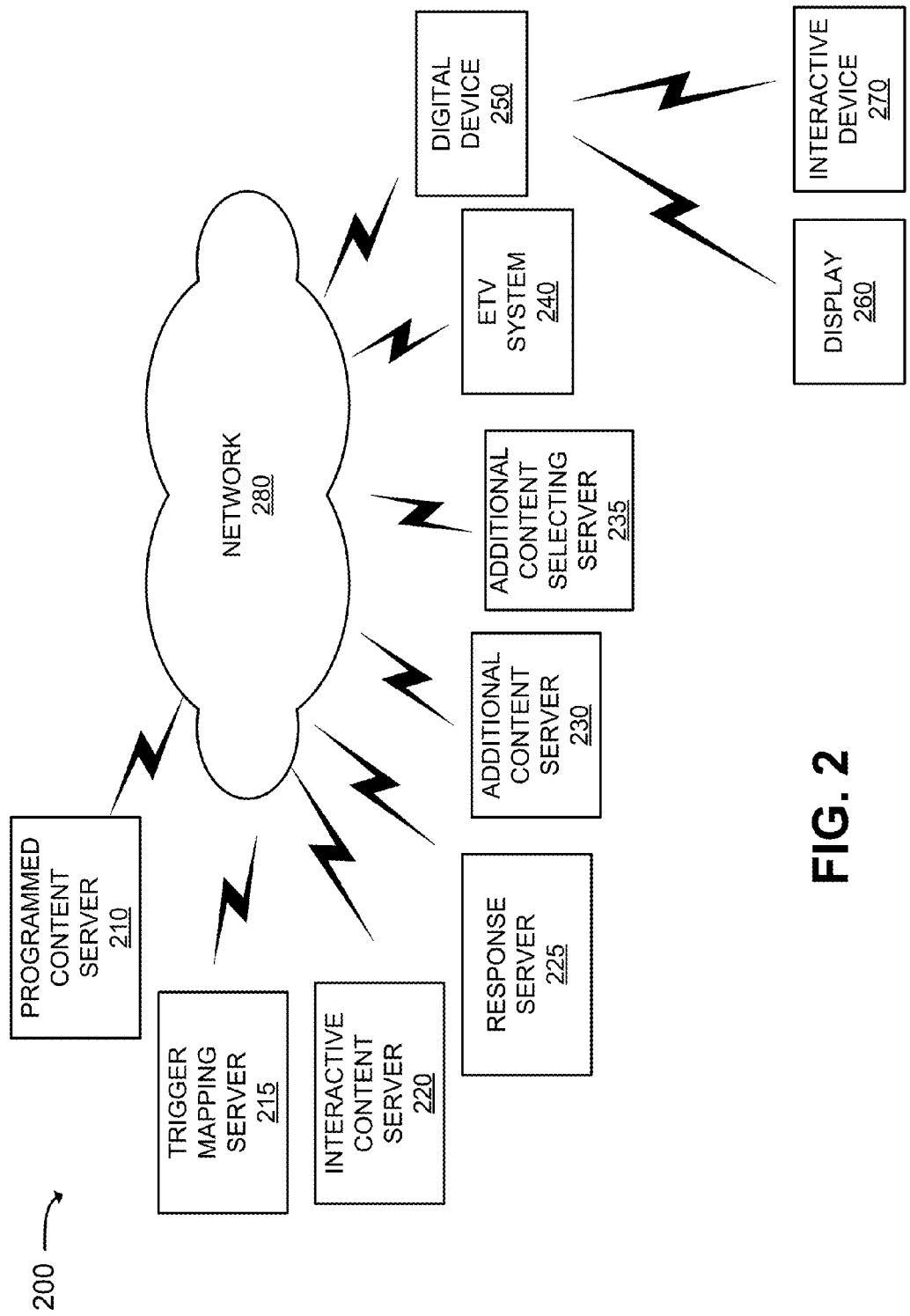
FIG. 2 is a diagram of example components used in an implementation described herein.

FIG. 2 is a diagram of example environment 200 in which systems and methods, described herein, may be implemented. As illustrated in FIG. 2, example environment 200 can include programmed content server 210, trigger mapping server 215, interactive content server 220, response server 225, additional content server 230, additional content selecting server 235, Enhanced Television (ETV) system 240, digital device 250, display 260, interactive device 270, and network 280. In practice, environment 200 may include additional, fewer, different, or differently arranged devices than are shown in FIG. 2. Also, two or more of these devices may be implemented within a single device, or a single device may be implemented as multiple, distributed devices. In some instances below, programmed content server 210, trigger mapping server 215, interactive content server 220, response server 225, additional content server 230, additional content selecting server 235, and ETV system 240 may be collectively referred to as "content platform."

Programmed content server 210 may include one or more server devices to provide programmed content to display 260 via digital device 250. The programmed content can include free television broadcast content (e.g., content from local broadcast providers, such as NBC, CBS, ABC, and/or Fox), for-pay television content (e.g., content from TNT, ESPN, HBO, Cinemax, CNN, etc.), on-demand content (e.g., content from FiOS, cable, and/or satellite service providers), and/or Internet-based content (e.g., content from YouTube, Vimeo, Netflix, Hulu, Veoh, etc.).

Programmed content server 210 may stream media content, such as video content (e.g., a video stream, video-on demand stream), audio content (e.g., an audio stream), textual content (e.g., a textual stream), and/or any combination of video content, audio content, or textual content.

Trigger mapping server 215 may include one or more server devices to provide mapping of the programmed content from programmed content server 210 to the interactive content from interactive content server 220 and the additional content from additional content server 230.

Trigger mapping server 215 can gather programming triggers from the programmed content from programmed content server 210, and can map these triggers to the interactive content from interactive content server 220 and/or the additional content from additional content server 230.

In one implementation, trigger mapping server 215 can be provided with a media stream from programmed content server 210, and trigger mapping server 215 can identify one or more triggers located in the media stream. For example, trigger mapping server 215 can run software to search for triggers in the media stream.

In another implementation, trigger mapping server 215 can receive trigger identifiers or indicators that can indicate when and where a trigger will occur. For example, trigger mapping server 215 can receive one or more messages from a third party service (e.g., a television guide service, an advertising service, etc.) or from a party affiliated with the interactive service (e.g., the additional content providers, the programmed content providers, network service providers, etc.) that indicate when (e.g., at a particular time of day, at a particular time during a particular show, etc.) and where (e.g., in which broadcast programming stream, in which video on-demand program, etc.) a trigger will occur.

In one implementation, trigger mapping server 215 can map triggers to interactive content from interactive content server 220. Trigger mapping server 215 can provide mapping points to interactive content server 220, such that interactive content server 220 can provide interactive content that relates to the trigger. For example, if trigger X is scheduled for a particular time, then the interactive content mapped to trigger X can be sent when trigger X occurs.

In one implementation, trigger mapping server 215 can include a backend rule engine. An example backend rule engine can be configured to sync the interactive content with a program guide download, or other programming information including video on-demand, and retrieve the information, such as channel name, program name, start time, end time, region, zip code, etc.

Interactive content server 220 may include one or more server devices to provide interactive content to select additional (or programmed) content. Interactive content server 220 may provide drop down menus, interactive areas, interactive menus, etc. to allow a user to interact with response server 225 to select additional or programmed content.

Response server 225 may include one or more server devices to receive a response from a user. Response server 225 can receive signals and route the signal to a server, such as programmed content server 210, additional content server 230, and/or ETV system 240. In one implementation, response server 225 can receive a signal from interactive device 270 via digital device 250 and network 280 indicting a selection of additional content. For example, a user can use a remote control (e.g., interactive device 270) to select an additional content program that is displayed on display 260. The remote control can send a signal to a STB (e.g., digital device 250), which can send the signal indicating the selection of the additional content program to response server 225. Response server 225 can receive the signal, and request the selected additional content from additional content server 230 for display on display 260 via the STB.

Additional content server 230 may include one or more server devices to provide additional content. Additional content server 230 may receive a signal from response server 225 indicating that the user has selected particular additional content. Additionally, or alternatively, additional content server 230 can receive trigger and mapping information from trigger mapping server 215, so that additional content server 230 can have the additional content selections offered by interactive content server 220 prepared when the trigger occurs. For example, if three content options are offered during a particular trigger, each of the three content options can be ready for streaming when response server 225 receives a selection of one of the three content options.

Additional content server 230 may access selected additional content, which can include any content that can be selected for a user by additional content selecting server 235.

Additional content selecting server 235 may select additional content to provide to digital device 250. Additional content selecting server 235 may provide additional content options to trigger mapping server 215 and/or interactive content server 220.

In one implementation, additional content can be selected by additional content selecting server 235 using information about the user that can assist in determining which additional content may be of interest. The information can include location information, programming history, or other available information on the user. For example, a user located in New York City can be provided with commercials for restaurants or events also located in New York City. As another example, a user who watches science fiction shows can be provided with advertisements for upcoming science fiction movies.

In another implementation, additional content can be selected by additional content selecting server 235 using information about the programmed content. For example, the information about the programmed content can include information about the programmed content program, genre, demographics, etc.

In another implementation, additional content can be selected by additional content selecting server 235 using information set by the service provider or a third party. For example, the information can include time-based information, such as advertising food items during meal times or advertising toys on weekends, season-based information, such as providing holiday shows from a third party during a video on-demand played during a holiday season, or service provider-based, such as advertisements for promotions being run by the service provider.

ETV system 240 may include one or more server devices to stream content from programmed content server 210, interactive content server 220, and/or additional content server 230 as an integrated media stream to digital device 250. ETV system 240 may acquire, decode, present information, and execute actions contained in a signal in order to present programmed content, interactive content, and/or additional content for display to a user. For example, ETV system 240 may present programmed content and when a trigger occurs, may present interactive content from interactive content server 220 to digital device 250 for display on display 260. Additionally, or alternatively, ETV system 240 may receive and stream additional content from additional content server 230.

ETV system 240 may be integrated with one or more devices, such as programmed content server 210, interactive content server 220, additional content server 230, and/or digital device 250 to provide the functionality of ETV system 240 in environment 200. In one implementation, ETV system 240 may be integrated into programmed content server 210, interactive content server 220, and/or additional content server 230 to provide programmed content, interactive content, and/or additional content to digital device 250 without a separate ETV system 240. In another implementation, ETV system 240 may be integrated with digital device 250.

Digital device 250 may include one or more devices to receive a signal for display on display 260. Digital device 250 may include a device that may receive and process a media stream from programmed content server 210, interactive content server 220, additional content server 230, and/or ETV system 240. Digital device 250 may be any device that can offer digital content of any type that can include programmed content, interactive content, and/or additional content. Digital device 250 can include a client application that can operate on digital device 250 to provide functionality to digital device 250.

In one example implementation, digital device 250 may include a STB, a DVR, a smart television, a computer device (e.g., a tablet computer, a laptop computer, a desktop computer, or other type of computer device), a cable card, a gaming device, an internet streaming player, a personal digital assistant (PDA), a mobile device, or the like.

Digital device 250 may receive a signal from programmed content server 210, interactive content server 220, additional content server 230, and/or ETV system 240. In one implementation, digital device 250 includes a STB that receives a signal from ETV system 240.

Digital device 250 may receive a signal in any format that can be converted for display on display 260. In one implementation, digital device 250 may receive content from signals provided over the Internet, a broadcast stream, such as a Quadrature Amplitude Modulation (QAM) channel, and can be formatted in an IP format, Enhanced Binary Exchange Format (EBIF), or any other digital format.

Digital device 250 may allow a user to alter the programming provided to display 260 based on a signal (e.g., an interaction with interactive content, a channel up signal, a channel down signal, an entry of a channel number, a selection of video on-demand program, etc.) from interactive device 270. Digital device 250 may be able to record video in a digital format to a disk drive or other memory medium within digital device 250. In one example implementation, digital device 250 may be incorporated directly within display 260 and/or may include a DVR.

Digital device 250 may subscribe to events related to, but not limited to, program changes, channel change, and video on-demand playback. Digital device 250 can be used to receive events for any broadcast channel, broadcast or recorded program, and/or video on-demand playback, including changes to schedules, etc. and can use the names of the broadcast channel, broadcast or recorded program, and/or video on-demand playback along with other details to select interactive content and/or additional content to supplement or replace programmed content. Digital device 250 can also store information, such as time of display, preferred frequency for interactive content display, mapping information, content, etc. Digital device 250 can provide interactive content via the stored information and/or via presenting the information to network 280 and receiving interactive content from network 280.

Digital device 250 can include a STB, which when activated, can tune to a channel for Live TV broadcast, recorded broadcast, video on-demand, etc. Additionally, digital device 250 can provide a current program description to display 260. Additionally, or alternatively, digital device 250 can monitor triggers, such as channel changes, and/or other events, to stop displaying the interactive content or offer alternative interactive content.

Display 260 may include a computer or television monitor that is capable of displaying content provided by digital device 250, and/or content provided by other devices (e.g., a Digital Video Disk (DVD) player, a video camera, etc., a desktop computer not shown) connected to display 260. Display 260 may include a digital or analog television through which a user may watch programming. For example, display

260 may include a high-definition television (HDTV) set. Display 260 may also include a display of an integrated digital device 250. For example, display 260 may include a display from a laptop computer, tablet computer, or mobile device.

Interactive device 270 may include a device that can interact with digital device 250. Interactive device 270 may include any device capable of remotely controlling the operation of digital device 250. Interactive device 270 may include a remote control, a smart phone, a game controller, a keyboard, a keypad, a PDA, a mobile telephone, or any other device capable of interacting with digital device 250. Interactive device 270 may provide commands to digital device 250 by transmitting signals, such as wireless signals (e.g., infrared, radio frequency (RF), or Bluetooth) or signals transmitted over wires (e.g., USB or the like), to a reader associated with digital device 250.

Network 280 may include one or more networks of any type, including a Local Area Network (LAN), a metropolitan area network (MAN), a wide area network (WAN), a cellular network, a satellite network, a broadcast television based network, the Internet, a private WAN, or a combination of the Internet and a private WAN, that is used to transport data. In one implementation, digital device 250 may stream or download interactive content via a wireless LAN (WLAN) (e.g., Wi-Fi (wireless fidelity)), a wireless WAN (WWAN) (e.g., EVDO (evolution data optimized)), sideloading (i.e., a transfer between two local devices), or a cable (e.g., universal serial bus (USB) interface or the like). Network 280 may also include a network that provides a wireless (radio) interface to digital device 250 using $3^{rd}$ generation (3G) or $4^{th}$ generation (4G) mobile telecommunications standards, for example.

Although shown as a single element in FIG. 2, network 280 may include a number of separate networks that function to provide services to digital device 250. In one implementation, network 280 may terminate at digital device 250 via an optical communication link, such as an optical fiber to the customer premises. In another possible implementation, network 280 may terminate at digital device 250 via a coaxial cable or other types of wired mechanisms. In yet another possible implementation, network 280 may represent over-the-air television broadcast channels that provides content to customer premises wirelessly.

Figure 3:
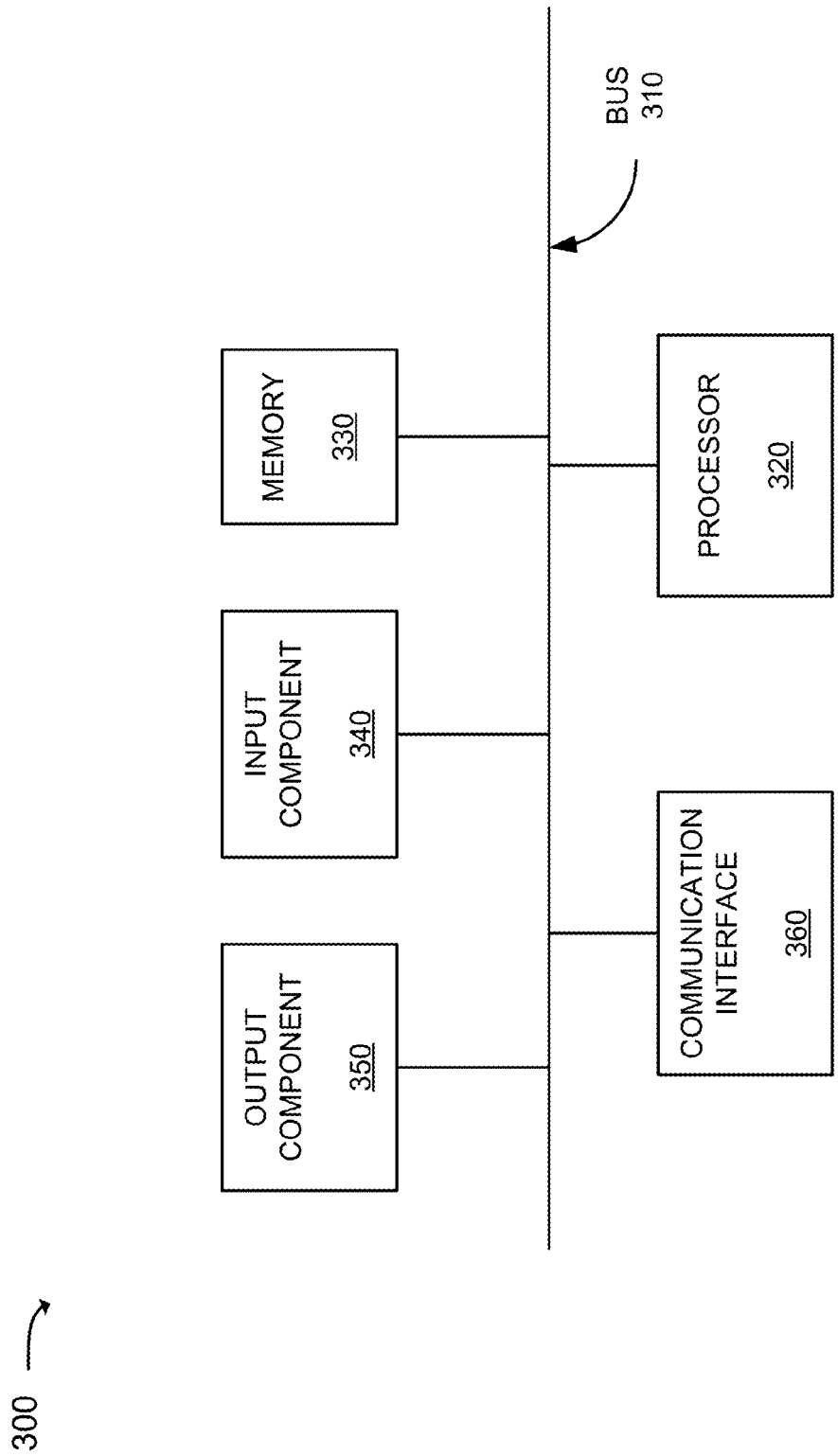
FIG. 3 is a diagram of example components of a device of FIG. 2.

FIG. 3 is a diagram of example components of a device 300 that may correspond to programmed content server 210, trigger mapping server 215, interactive content server 220, response server 225, additional content server 230, additional content selecting server 235, ETV system 240, digital device 250, display 260, and/or interactive device 270. Device 300 may include a bus 310, a processor 320, a memory 330, an input component 340, an output component 350, and a communication interface 360. In another implementation, device 300 may include additional, fewer, different, or differently arranged components.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, or the like.

As will be described in detail below, device 300 may perform certain operations relating to providing interactive and additional content. Device 300 may perform these and other operations in response to processor 320 executing software instructions contained in a computer-readable medium, such as memory 330. A computer-readable medium may be defined as a non-transitory memory device. A memory device may include memory space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
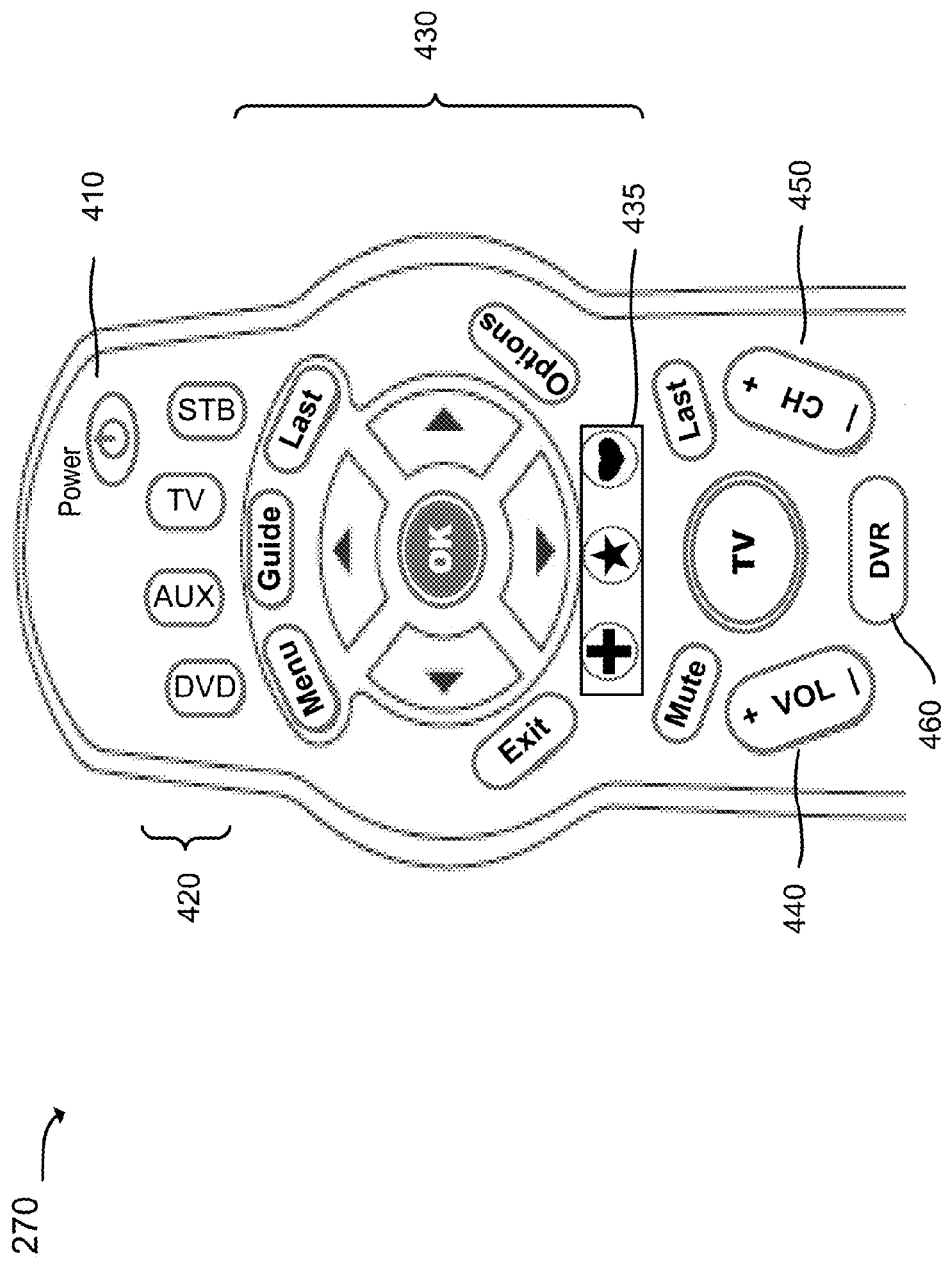
FIG. 4 is a diagram of an example input device for interacting with interactive content according to an implementation described herein.

FIG. 4 is an example diagram of a portion of interactive device 270. As shown in FIG. 4, interactive device 270 may be a remote control with buttons 410, 420, 430, 435, 440, 450, and 460 that may cause digital device 250 to perform various functions. For example, interactive device 270 may include a power button 410, device selection buttons 420, interactive content buttons 430 including icon bearing buttons 435, volume button 440, channel button 450, and DVR button 460.

Power button 410 may cause a controlled device (e.g., digital device 250 or another device, such as a receiver, a VCR, or a DVR) to power up or down.

Device selection buttons 420 may identify a device to be controlled, such as digital device 250 or another device, such as a receiver, a VCR, or a DVR.

Interactive content buttons 430 may include buttons for interacting with television content. For example, one or more of interactive content buttons 430, such as icon bearing buttons 435, may be used to interact with interactive content to select additional content corresponding to one of the interactive content buttons 430.

Volume button 440 may cause a controlled device to change its volume setting. Channel button 450 may cause a controlled device to change its channel setting. DVR button 460 may cause a DVR program schedule to be displayed that may include information associated with television content that the user has selected for recording, play back, etc.

While FIG. 4 illustrates example buttons of interactive device 270, in another implementation, a different type of interactive device may be used to cause digital device 250 to perform various functions associated with providing interactive content. In another implementation, a user may control digital device 250 by pressing certain buttons on digital device 250 and/or another communication or control device. In yet another implementation, a computer, a cellular/mobile phone, a PDA, and/or another device capable of wireless communications (e.g., infrared, Bluetooth and/or other wireless capabilities) may control digital device 250.

Figure 5A:
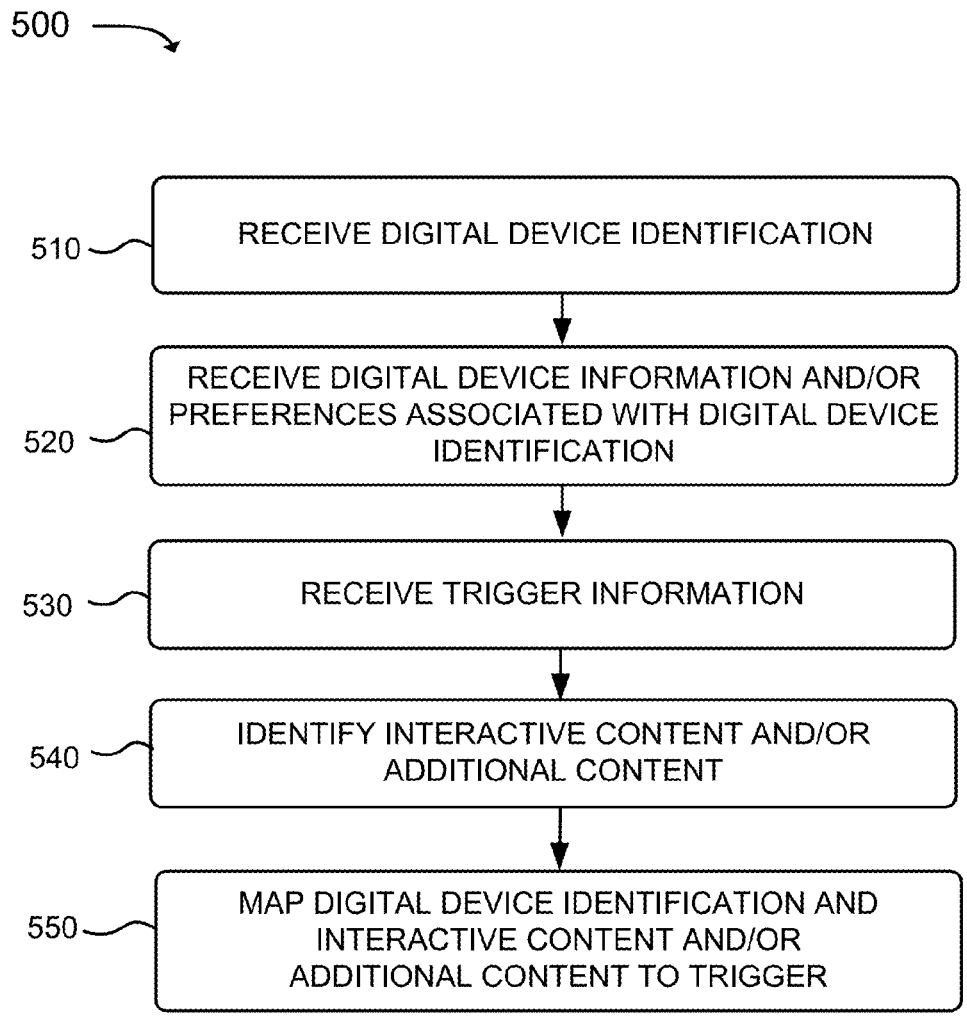
FIG. 5A is a flowchart of an example process for mapping interactive content to one or more triggers according to an implementation described herein.

FIG. 5A is a flowchart of an example process 500 for mapping interactive content to one or more triggers according to an implementation described herein. In one implementation, process 500 may be performed by the content platform. As indicated above, the content platform may include programmed content server 210, trigger mapping server 215, interactive content server 220, additional content server 230, additional content selecting server 235, and ETV system 240. In one implementation, some or all of process 500 may be performed by a device or collection of devices separate from, or in combination with the content platform.

Process 500 may include receiving digital device identification (block 510). In one implementation, the content platform may receive the digital device identification from digital device 250, one or more servers, a third party, or any other source. The digital device identification can be an alphanumeric code that can represent a specific digital device 250 or a group of digital devices.

Process 500 may include receiving digital device information and/or the preferences associated with the digital device identification (block 520). In one implementation, the content platform may receive the digital device information and/or preferences. The digital device information can include information specific to digital device 250, such as a location of digital device 250, viewing history stored on digital device 250, etc. The preferences can include preferences of a user or a third party, such as results from an opt-in user survey, a third party advertising campaign, etc. In one implementation, the digital device information and/or the preferences can be associated with one or more digital device identifications in a data structure.

Figure 5B:
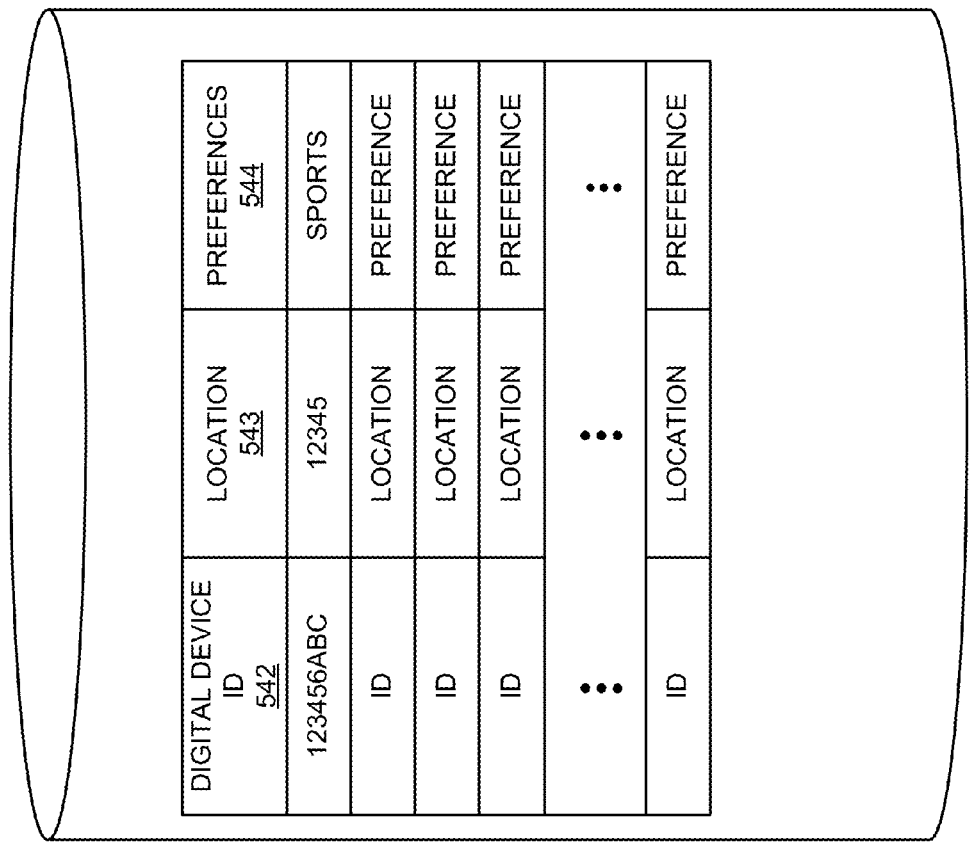

FIG. 5B is a portion of an example data structure 541 that may be associated with one or more components of FIG. 2. While only one data structure is described below, data structure 541 may include multiple data structures stored at one or more server devices, such as programmed content server 210, trigger mapping server 215, interactive content server 220, response server 225, additional content server 230, additional content selecting server 235, and/or ETV system 240.

As illustrated in FIG. 5B, data structure 541 may be used to associate the digital device identification to the digital device information and/or the preferences provided to the content platform. Data structure 541 may maintain a group of entries in the following example fields: a digital device identification (ID) field 542, a location field 543, and one or more preference fields 544 (illustrated as a single field for simplicity). Data structure 541 can maintain additional or different information (not shown) that can assist in selecting interactive content and/or additional content for supplementing or replacing programmed content.

Digital device ID field 542 may store information that identifies a particular digital device 250 or a group of digital devices 250. Digital device ID field 542 may store information that identifies a group of digital devices 250 that may share similar attributes with other digital devices 250 in the group, such as the group of digital devices that were issued to users in a geographical region. Digital device ID field 542 may include identification information, such as a sequence of characters that can uniquely identify the particular digital device 250 or group of digital devices 250.

Digital device 250 can provide digital device information for selecting interactive content and/or additional content, which can be specific to a particular digital device 250. In one implementation, digital device information, such as a history of programs, location information, etc., can be stored with the digital device identification to associate the digital device 250 with the digital device information. For example, as illustrated in FIG. 5B, one particular digital device 250 can have identification information of "123456ABC" listed in digital device ID field 542 and this identification information can be mapped to digital device information, such as the location of digital device 250 (e.g., "12345") in location field 543, and any preferences associated with digital device 250, such as the primary genre viewed on digital device 250 (e.g., "SPORTS") in preferences field 544.

Location field 543 may include information that identifies a geographical location of the particular digital device 250 identified in digital device ID field 542. The geographical location can be used to select interactive content and/or additional content. In one implementation, the geographical location can be used to identify interactive content and/or additional content corresponding to the geographical location. For example, the particular digital device 250 with the identification information of "123456ABC" as noted in digital device ID field 542 can be located in geographical location "12345," which can correspond to a zip code or any other identifier of a geographical location that can be used in data structure 541 to assist in selecting interactive content and/or additional content.

In one implementation, data structure 541 may include preferences field 544, which can include information from a viewing history stored in digital device 250 or other preferences that may be stored in digital device 250 or on one or more servers. For example, preferences field 544 may include information about which genre is most viewed on digital device 250. As illustrated in FIG. 5B, digital device 250 with the digital device ID of "123456ABC" may prefer sports based shows and may also prefer sports type interactive content and/or additional content.

Additionally, or alternatively, preferences, such as those that might be expressed in a user survey, may be associated with the digital device identification. In one implementation, results of a survey, in which the user may indicate preferences for particular types of interactive content and/or additional content, can be provided for mapping. For example, a user may indicate in a survey that they prefer sports-related interactive content and data structure 541 can note that digital device 250 associated with the user should provide sports-related interactive content and/or additional content.

Additionally, or alternatively, multiple preference fields for a user may be provided, such as genre of shows, types of advertisements preferred, watching habits, etc. Additionally, or alternatively, multiple preference fields for a third party may be provided, such as types of advertisements selected based on user preferences, types of programming selected based on time of year, etc.

Returning to FIG. 5A, process 500 may include receiving trigger information (block 530). In one implementation, a trigger can include EBIF triggers, channel changes, and start times for a show or a commercial. For example, a broadcasting company can provide a list of triggers in the form of a listing of commercials and scheduled airing times for the commercials for their broadcast stream. In another example, a video on-demand provider can provide a list of triggers as a list of videos that can be accessed along with the times and/or channels that may be involved in showing the videos, such that the start and/or end of a video can be a trigger.

In one implementation, the trigger information can include lists of times and places of triggers in the programmed content. For example, a list of triggers can include trigger information, such as each commercial break for a television show or an end time for a video on-demand. Additionally, trigger information can be provided minutes, hours, days, or weeks in advance of a the programmed content being available for viewing.

In one implementation, trigger information can be provided with a broadcast mapping stream from programmed content server 210 to trigger mapping server 215, and trigger mapping server 215 can identify one or more triggers located in the broadcast programming stream. For example, trigger mapping server 215 can include software to identify commercials broadcast in a live television stream.

In another implementation, trigger mapping server 215 can receive trigger information from a broadcaster, a third party service or a party affiliated with the interactive service, as mentioned above.

Process 500 may include identifying the interactive content and/or the additional content that will be provided with the trigger (block 540). Identifying interactive content and/or additional content can be done by additional content selecting server 235. Additional content selecting server 235 can use information, such as the digital device information and/or the preferences, to identify interactive content and/or additional content that can be provided when a trigger is received. In one implementation, a few additional content options can be chosen and can be presented as the interactive content. For example, if there are three commercials that are selected to be shown as a substitute for a programmed content, such as an original commercial, identifiers for each of the three commercials can be displayed as the interactive content for a user to select one of the commercials for viewing as a substitute for the programmed content.

In one implementation, information, such as the digital device information including the location of digital device 250, past viewing history, current show, Internet browsing history, etc., and the preferences including preferred genres, etc., can be provided by digital device 250 to network 280. The information can be used by additional content selecting server 235 to select interactive content and additional content for a particular user for a trigger. For example, additional content selecting server 235 can use the location of digital device 250 to select one or more additional content options based on location, such as advertisements from local franchises, that can supplement or replace the programmed content, such as advertisements from national chains, when the trigger occurs, and/or interactive content server 220 can provide one or more additional content options from additional content server 235 to digital device 250 for selection of one additional content to be provided.

In one implementation, selecting interactive content and additional content can include searching data structures for additional content, such as advertising content, movies, television programming, video on-demand programs, etc., that may be relevant to the programmed content or other information. For example, if a movie (e.g., the programmed content) is selected via video on-demand, then additional content options (e.g., the interactive content) can be tailored to provide the options of showing various advertisements for a certain demographic that might be associated with the movie, interactive displays of other movies starring one or more of the same actors, or television programs that are classified in the same or similar genre to the movie.

Process 500 may include mapping the digital device identification and the interactive content and/or the additional content to a trigger (block 550). In one implementation, trigger mapping server 215 can map triggers to the digital device identification and the interactive content and/or the additional content, and can provide mapping information about the mapped triggers to digital device 250. For example, trigger mapping server 215 can create a map that identifies which digital device 250 will receive interactive content and/or additional content when the trigger occurs. As another example, trigger mapping server 215 can create a map that allows interactive content server 220 to provide specific interactive content when the trigger occurs and allows additional content server 230 to provide additional content when a selection of the additional content is received by response server 225 in response to a selection from the interactive content.

In one implementation, interactive content can be mapped to a trigger and the interactive content can be provided over the internet, a broadcast stream, such as a QAM channel, or any routing that can provide content when a trigger is detected. In one implementation, interactive content server 220 can map specific triggers to specific interactive content, such that when a specific trigger occurs, interactive content server 220 can provide the specific interactive content that was mapped by interactive content server 220, to digital device 250. For example, the mapping of the interactive content to the triggers can be provided by trigger mapping server 215 as a data file that can be stored on digital device 250. Additionally, or alternatively, multiple channels can be provided with additional content provided on each channel or stream. For example, 10 QAM streams can be provided to supply additional content to be used in conjunction with the mapping of the interactive content and the selection of additional content for display.

In one implementation, mapping the tailored interactive content with the trigger can include associating a unique identifier (e.g., a unique identification code) with the tailored interactive content, such that when the trigger occurs, the unique identifier can be recalled and the interactive content can be provided.

Trigger information can be provided in advance of viewing, which can allow additional content providers, such as advertisers or broadcasters, to select interactive content and additional content that can be tailored to a specific user. Additionally, or alternatively, trigger information can be provided in the form of a program guide, which can include programmed content, such as live television programs and commercials.

FIG. 5C is a portion of an example data structure 560 that may be associated with one or more components of FIG. 2. While only one data structure is described below, data structure 560 may include multiple data structures stored on one or more server devices, such as programmed content server 210, trigger mapping server 215, interactive content server 220, response server 225, additional content server 230, additional content selecting server 235, and/or ETV system 240.

As illustrated, data structure 560 may maintain a group of entries in the following example fields: digital device ID field 542, trigger identifier field 561, programmed content information field 562, interactive content icon and display field 563, and additional content information field 564. Data structure 560 may maintain additional or different information (not shown) that can aid in mapping triggers to digital device 250, programmed content, interactive content, and/or additional content. Also as illustrated, data structure 560 may list one or more entries for each digital device id and/or trigger identifier to correspond to options available for interactive content and/or additional content.

Digital device ID field 542 may be from data structure 541 or may be provided for data structure 560. In one implementation, data structure 541 can be used to create data structure 560 and the digital device ID field 542 can be provided to data structure 560 when data structure 560 is created.

Trigger identifier field 561 may include an identifier, such as a numerical or alphanumerical identifier, or other code that can be mapped to a trigger. In one implementation, trigger identifiers can be provided by a service provider, broadcaster, or third party service. For example, a service provider can provide trigger identifiers for each commercial located during a particular time period for one or more broadcast stations. In another implementation, trigger identifiers can be identified by software at one or more servers. For example, trigger mapping server 215 can identify trigger identifiers embedded into a broadcast stream or from an Internet Protocol (IP) feed provided to trigger mapping server 215.

The trigger identifiers in the trigger identifier field 561 can be unique to a particular time and place, or can be duplicated for similar content. For example, if a particular advertisement is shown multiple times during the same program, then each instance of the particular advertisement can have the same trigger identifier in trigger identifier field 561.

Programmed content information field 562 may include information about the programmed content. In one implementation, the title or other descriptive information can be provided in the programmed content information field 562. For example, as illustrated in FIG. 5C, a trigger, such as a national store advertisement as identified in programmed content information field 562, can be identified by trigger identifier "15139" in trigger identifier field 561.

Interactive content icon and display field 563 may include an icon that can be selected by interactive device 270 and information about the interactive content. In one implementation, the interactive content icon and display field 563 can have multiple interactive options corresponding to a single trigger. For example, as illustrated in FIG. 5C, interactive content icon and display field 563 can have a "NATIONAL AD" with a first icon 565, a "LOCAL AD" with a second icon 566, and a "LOCAL COUPON" with a third icon 567. The interactive content icon and display field 563 information can be displayed as the interactive content, or can be used to correlate information between displayed interactive content and selections made from the interactive content by selecting one of the icons.

Additional content information field 564 may include information about the additional content that can be provided (e.g., a link to the additional content). In one implementation, the additional content in additional content information field 564 can correspond to the additional content that will be provided upon selection of the corresponding interactive content icon. For example, if the "NATIONAL AD" and the first icon 565 is selected via interaction with the interactive content, then the additional content that can be supplied can be the "NATIONAL AD" 568. Similarly, if "LOCAL AD" and the second icon 566 is selected, then the "LOCAL AD" 569 can be provided, and if "LOCAL COUPON" and the third icon 567 is selected, then "LOCAL COUPON" 570 can be provided.

In one implementation, content, such as a video on-demand program, can include frames or coordinates embedded or associated with interactive content to dynamically provide triggers to cause interactive content to be displayed during video on-demand viewing. For example, a video on-demand program can be captured, stored, and mapped with individual frames, parts of individual frames, or coordinates within the program being mapped to interactive content. By mapping the video on-demand program, during the playback of the video on-demand program, a trigger can be sent automatically to interactive content server 220 to provide the interactive content at the mapped locations. Additionally, or alternatively, interactive content can be associated with particular triggers associated with selecting a video on-demand program or viewing a portion of a video on-demand program that can be based on geographical location, time elapsed into a program, or any other trigger that can be identifiable and provide an opportunity to provide interactive content.

Interactive content server 220 may provide interactive content for a select set of triggers. In one implementation, the quantity of interactive content can be adjusted to accommodate the requests of a user and/or accommodate system limitations by one or more server devices and/or digital device 250. For example, a user may select to only see interactive content when the user watches sporting events. As another example, digital device 250 may be able to process only the 50 most popular programs before running into hardware capacity issues.

Additionally, trigger mapping server 215, interactive content server 220, and/or additional content server 230 may dynamically update and refresh interactive content, additional content, triggers, and/or mappings. For example, a television show (and the television show's triggers) can be moved to a new time. This change in schedule can cause trigger mapping server 215 to dynamically update the mapping to reflect the change in the trigger information.

Data containing the mapping, interactive content, and/or additional content may be stored or streamed. In one implementation, data containing the mapping, the interactive content, and/or the additional content may be stored by trigger mapping server 215, interactive content server 220, additional content server 230, ETV system 240, and/or digital device 250. In another implementation, data containing the mapping, the interactive content, and/or the additional content may be provided upon receipt of a trigger or a selection of the interactive content and/or the additional content.

Figure 6:
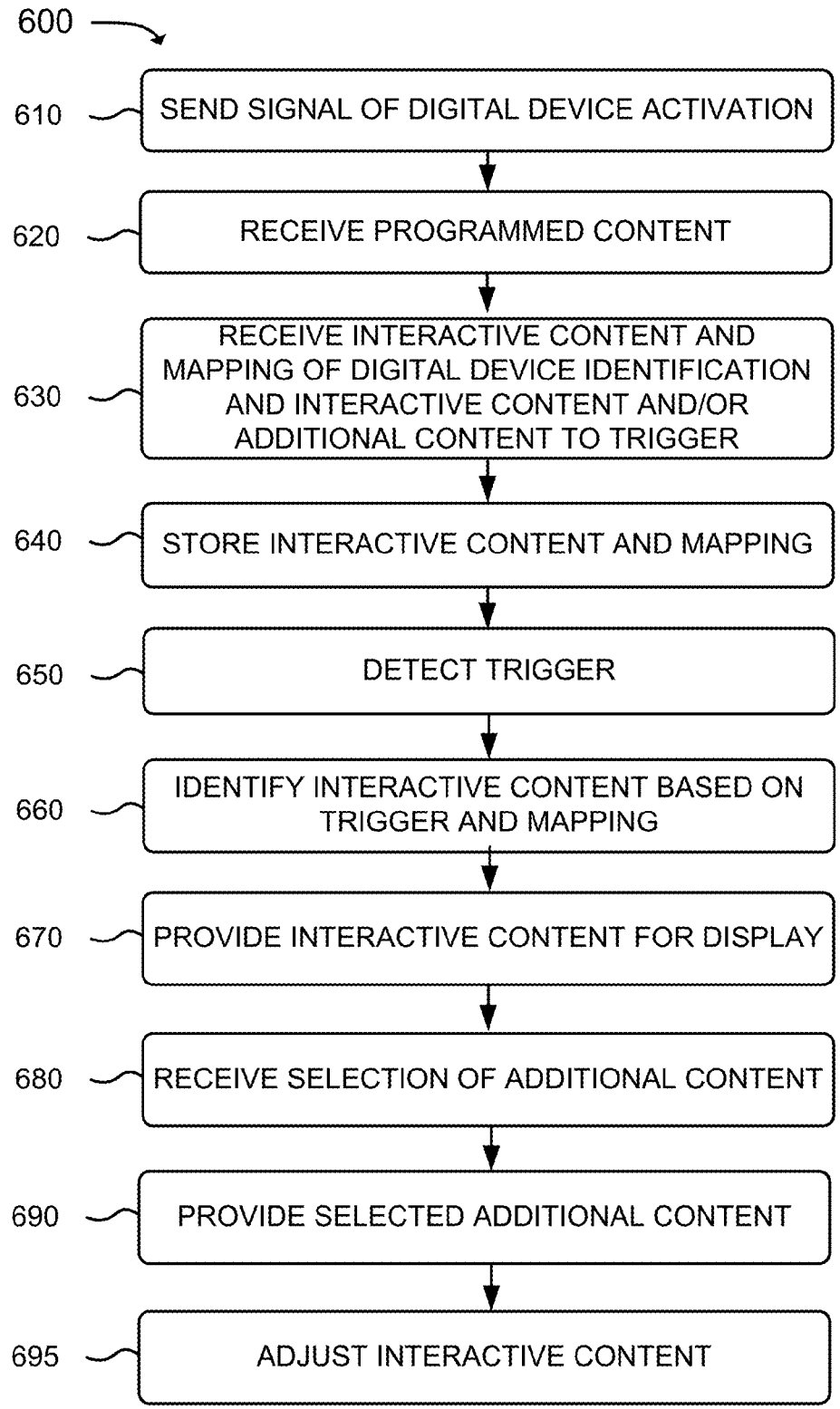
FIG. 6 is a flowchart of an example process for providing additional content through interaction with interactive content according to an implementation described herein.

FIG. 6 is a flowchart of an example process 600 for providing additional content through interaction with interactive content according to an implementation described herein. Example process 600 can utilize the mapping of the interactive content to one or more triggers provided by example process 500. In one implementation, process 600 may be performed by digital device 250. In another implementation, some or all of process 600 may be performed by a device or collection of devices separate from, or in combination with, digital device 250.

Process 600 may include sending a signal indicating activation of digital device 250 (block 610). In one implementation, a signal can be sent from digital device 250 when digital device 250 is turned on or when an application associated with programmed content is activated. For example, a tablet computer may activate a video streaming application, and a signal can be sent indicating that the tablet computer has activated the video streaming application. As another example, a STB can be turned on, and a signal can be sent indicating activation of the STB.

Process 600 may include receiving programmed content (block 620). In one implementation, programmed content can be received by digital device 250 from programmed content server 210 through ETV system 240. For example, a live television show can be received by digital device 250 from a television broadcast programmed content server 210, such as a local broadcast station.

Process 600 may include receiving interactive content and mapping of the digital device identification and the interactive content and/or the additional content to the trigger (block 630). In one implementation, receiving interactive content and mapping of the digital device identification and the interactive content and/or the additional content to the trigger can include downloading from the network (e.g., the Internet) the interactive content and mapping of trigger to the digital device identification and the interactive content. In one implementation, the interactive content and mapping of the trigger can be sent from trigger mapping server 215 to interactive content server 220, additional content server 230, and/or digital device 250. For example, data structure 560 from FIG. 5C can be provided to interactive content server 220, additional content server 230, and/or ETV system 240 to provide the mapping to digital device 250.

Process 600 may include storing the interactive content and the mapping of the digital device identification and the interactive content and/or the additional content to the trigger (block 640). In one implementation, the interactive content and mapping can be received from interactive content server 220 and/or trigger mapping server 215 and can be stored in the memory of digital device 250. In one implementation, the interactive content, the additional content, and/or the mapping information can be provided as a data file for downloading into the memory of digital device 250, and the data file, such as data structure 560, can be provided on a rolling basis. Data structure 560, for example, can be stored on digital device 250 for a one hour block, and digital device 250 can access the content platform to obtain interactive and/or additional content based on data structure 560 during the one hour block.

Process 600 may include detecting the trigger (block 650). In one implementation, triggers can be detected by identifying the trigger when the trigger occurs. For example, if the trigger is a commercial scheduled for a given time, then at the given time, when the commercial begins, the trigger can occur and be detected. In another implementation, triggers can be identified in advance of the trigger occurring. For example, a listing of the triggers can be provided by a service provider that includes a schedule and trigger identification for each trigger in advance of the triggers occurring.

Process 600 may include identifying interactive content based on the trigger and the mapping of the digital device identification and the interactive content and/or the additional content to the trigger (block 660). In one implementation, digital device 250 can detect a trigger and can retrieve the interactive content from either a memory of digital device 250 or from the content platform. If digital device 250 retrieves the interactive content from the content platform, digital device can send information identifying digital device 250 (e.g., the digital device identification) and information identifying the trigger. On the network side, the content platform can receive the information identifying digital device 250 and the trigger, identify the interactive content based on this information and the mapping, and can send the interactive content to digital device 250.

In one implementation, a data file, such as data structure 560, can contain identification information for the interactive content and mapping of the triggers, the data file can be accessed by digital device 250, and the interactive content can be identified based upon the mapping of the trigger to the interactive content. For example, if the start of a national commercial for a national chain is a trigger, digital device 250 can use the mapping (e.g., data structure 560) to identify the interactive content associated with the trigger (e.g., the national commercial) to be displayed when the trigger is detected.

Process 600 may include providing interactive content for display (block 670). The interactive content can be retrieved from a memory of digital device 250 or provided by interactive content server 220 to digital device 250 for display on display 260. In one implementation, the interactive content can be provided as a replacement for the programmed content of the media stream or a supplement on the programmed content of the media stream. For example, the interactive content can be displayed as a pop-up banner across a portion of display 260. In one implementation, as illustrated in FIG. 5C, the interactive content can be mapped in data structure 560, and the interactive content, along with an interactive content icon and display, can be mapped to interactive content icon and display field 563 for displaying.

Figure 7A:
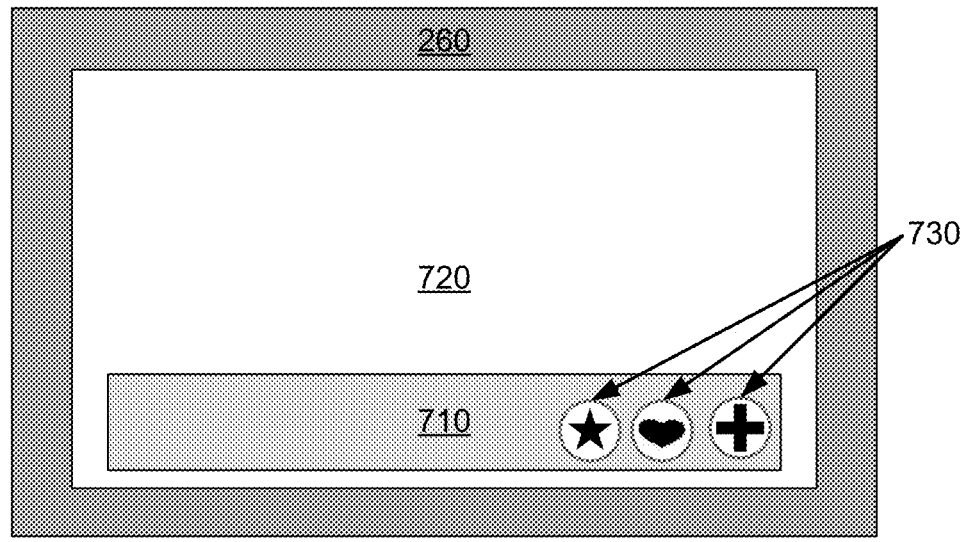
FIGS. 7A, 7B, and 7C are diagrams that illustrate example implementations of interactive content being displayed for selecting additional content, as described herein.
Figure 7B:
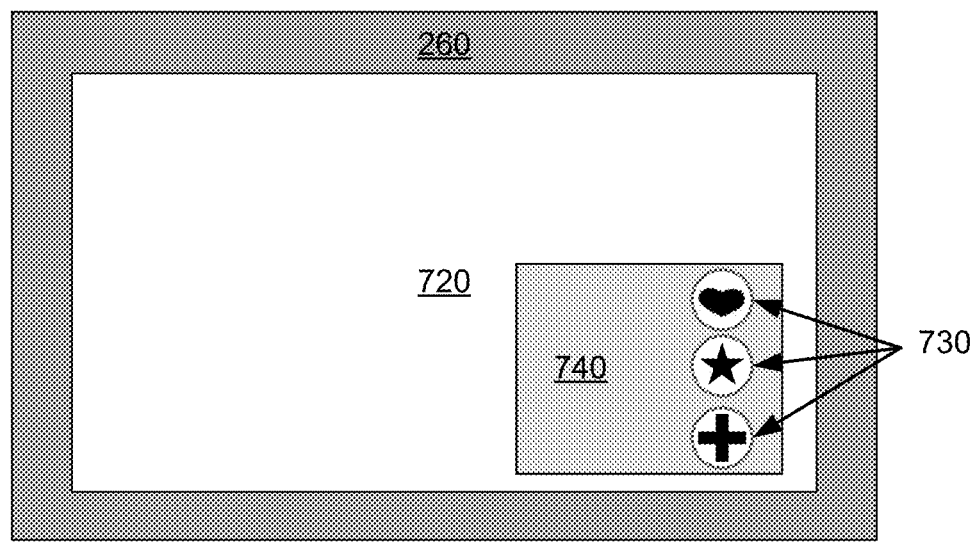
Figure 7C:
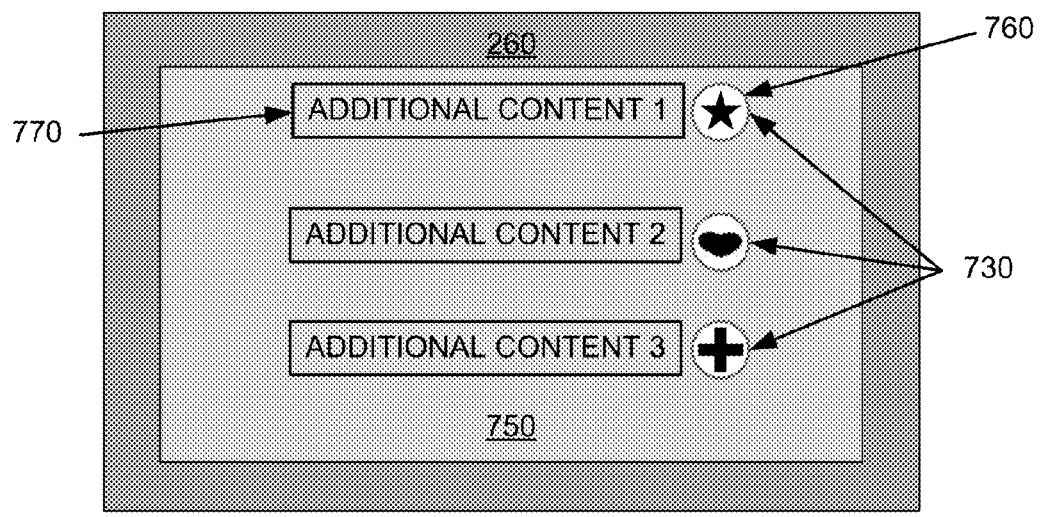

FIGS. 7A-7C are diagrams that illustrate example implementations of interactive content being displayed on display 260 for selecting additional content, as described herein.

In FIG. 7A, programmed content 720 can be displayed on display 260 (e.g., a television or any other display for digital device 250), and the interactive content in the form of a supplemental banner 710 can be displayed on a lower portion of display 260 (or any other portion of the display 260) supplementing programmed content 720. One or more interactive option selectors 730 for interacting with interactive content can be provided. By selecting one of the one or more interactive option selectors 730 (e.g., by selecting a corresponding icon bearing button 435 on interactive device 270 or scrolling through options using interactive content buttons 430 on interactive device 270 or the like), a signal may be generated indicating which, if any, additional content is selected.

In one implementation, interactive buttons 430 can correspond to requesting more information, purchase of a product, changes to the interactive content, etc. For example, a user of digital device 250 can use interactive device 270 to select one of the interactive option selectors 730 corresponding to additional content, such as a coupon for getting $5 off a particular item or a buy one get one free offer. In response to the interactive option selector 730 being selected, digital device 250 can receive additional content from additional content server 230, such as a downloadable coupon, an access key, or a keyword that can be used to apply the particular discount at the establishment.

Similarly in FIG. 7B, programmed content 720 can be displayed on display 260, and interactive content 730 can also be displayed in the form of a pop-up window 740. The pop-up window 740 can be displayed on the display 260 supplementing any portion of the display 260, and can include one or more of the interactive option selectors 730.

Similarly in FIG. 7C, programmed content 720 can be replaced by interactive content 750 that can list options and corresponding icons, such as additional content. Interactive content 750 can replace programmed content 720 (from FIGS. 7A and 7B) on display 260. Interactive content 750, as illustrated in FIG. 7C, can include one or more interactive option selectors 730, which can include descriptions of additional content that will be provided upon selection. For example, selecting star 760 would cause the additional content relating to the "ADDITIONAL CONTENT 1" option 770 to be provided.

Returning to FIG. 6, process 600 may include receiving a selection of additional content (block 680). In one implementation, a user of digital device 250 can interact with digital device 250 to select additional content, and the selection made can be sent from response server 225 to be received by additional content server 230. For example, a user can interact with interactive content using interactive device 270, such as a remote control illustrated in FIG. 4, to select specific additional content via selecting an icon from the interactive content, and the specific additional content can be received by digital device 250.

Process 600 may include providing the selected additional content based on the interaction with the interactive content (block 690). In one implementation, digital device 250 can provide the selected additional content from additional content server 230 based upon a signal received from interactive device 270 and/or the mapping of the additional content from trigger mapping server 215. For example, a user can select additional content by selecting an icon representing the additional content on display 260 by selecting a corresponding input on interactive device 270. In one implementation, as illustrated in FIG. 5C, data structure 560 can be used to map an interactive icon selected by interactive device 270 to additional content from additional content information field 564. For example, if interactive icon 565 is selected, then the corresponding "NATIONAL AD" 568 (e.g., the additional content in additional content information field 564) can be provided.

Process 600 may include adjusting the interactive content based on the interaction with the interactive content (block 695). In one implementation, digital device 250 can receive an interaction from interactive device 270 requesting that the interactive content not be provided or requesting other content than the interactive content, and digital device 250 can stop playing the interactive content (e.g., revert to the programmed content). Additionally, or alternatively, digital device 250 can receive an interaction from interactive device 270 requesting alternative content, and digital device 250 can offer alternative interactive content (e.g., other interactive content options leading to alternative additional content).

In one implementation, digital device 250, via a digital device ID, can be mapped to information, such as location, user information, third party information, or other information, for use in selecting content for digital device 250. This information can identify particular content that can be provided to digital device 250 as interactive content and/or additional content. For example, a digital device ID can be mapped to a location, which can be used to identify interactive content and/or additional content that might be of interest to those users of digital device 250 in a particular geographic region that includes the location of digital device 250. If digital device 250 detects a trigger and the trigger's identification, then digital device 250 through network 280 can find and provide the interactive content and/or the additional content that corresponds to the trigger's identification and the digital device ID, via the mapping. Additionally, or alternatively, the mapping, the interactive content, and/or the additional content can be stored on digital device 250, and the interactive content and/or the additional content can be provided directly from digital device 250 or via network 280.

A system and a method, described herein, may provide additional content as a supplement or replacement to programmed content based upon a user interaction with interactive content. The interactive content can be mapped to a trigger in the programmed content and when the trigger occurs, the interactive content can be displayed. The user can interact with the interactive content to select the additional content.

The foregoing description provides illustration and description, but is not intended to be exhaustive or to limit the implementations to the precise form disclosed. Modifications and variations are possible in light of the above examples or may be acquired from practice of the implementations.

While series of blocks have been described with regard to FIGS. 5A and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a server, an identification of a device;
   receiving, by the server, at least one of device information, which includes a location of the device or a viewing history for the device, or preference information, which includes preferences by a user or a third party, associated with the identification of the device;
   identifying, by the server, interactive content based on the at least one of the device information or the preference information;
   receiving, by the server, trigger information, which includes multiple times and places for a single trigger, the trigger information to identify a plurality of instances of an event relating to a provisioning of programmed video content of a media stream;
   mapping, by the server, the identification of the device and the identified interactive content with the trigger information;
   detecting, by the server, that multiple instances of the event have occurred in the programmed video content; and
   sending, by the server and responsive to the detected instances, the identified interactive content multiple times based on the mapping and the trigger information corresponding to the single trigger.

2. The method of claim 1, where identifying the interactive content based upon the at least one of the device information or the preference information includes identifying the interactive content based on programmed content provided to the device and/or a history of the programmed content accessed via the device.

3. The method of claim 1, further comprising:
   selecting additional content based upon information from the server, where the additional content is provided by the server based on at least one of the device information or the preference information.

4. The method of claim 3, where selecting the additional content based upon information from the server includes selecting additional content based on programmed content and/or a history of the programmed content accessed through the device.

5. The method of claim 1, where receiving at least one of the device information or the preference information comprises receiving the preference information by:
receiving user information about a user viewing programmed content provided to the device or receiving user information from preferences entered into the device.

6. The method of claim 1, further comprising:
sending the interactive content via an internet protocol (IP) channel when the triggering event is detected; and
sending additional content via an IP channel when a selection from the interactive content is received.

7. The method of claim 1, further comprising:
sending programmed content via a first Quadrature Amplitude Modulation (QAM) channel to the device; and
sending the mapping of the device identification and identified interactive content and/or additional content via a second QAM channel to the device.

8. A method, comprising:
receiving, by a server, an identification of a device;
receiving, by the server, selection information to select interactive content or additional content for the device;
associating, by the server, the identification of the device with the selection information;
identifying, by the server, interactive content based upon the selection information, wherein the interactive content includes a set of selectable icons corresponding to multiple interactive options;
identifying, by the server, an event within programmed content;
receiving, by the server, trigger information associated with the event within the programmed content;
mapping, by the server, the identification of the device and the identified interactive content with the trigger information;
detecting, by the server, an occurrence of the event; and
sending, by the server and based on detecting the occurrence of the event, the identified interactive content, including the set of selectable icons corresponding to multiple interactive options, to supplement or replace the programmed content according to the mapping.

9. The method of claim 8, where identifying the interactive content based upon the selection information includes identifying the interactive content based on information about the programmed content provided to the device and/or a history of the programmed content accessed via the device.

10. The method of claim 8, further comprising:
mapping additional content to the mapping of the identification of the device and the identified interactive content with the trigger information;
providing the interactive content as one or more options for additional content via the device;
receiving a selection of one of the one or more options via the device;
selecting the additional content based upon the selection of the one of the one or more options and the mapping of the additional content to the mapping of the identification of the device and the identified interactive content with the trigger information; and
sending the selected additional content to supplement and/or replace the programmed content or the interactive content on the device.

11. The method of claim 8, further comprising:
gathering user information about a user viewing the programmed content, where identifying the interactive content includes identifying the interactive content based upon the user information.

12. The method of claim 8, further comprising:
sending the identified interactive content via an internet protocol (IP) channel when the occurrence of the event is detected; and
sending additional content via an IP channel upon selection of the additional content from options provided in the interactive content.

13. The method of claim 8, further comprising:
sending the programmed content via a first Quadrature Amplitude Modulation (QAM) channel; and
sending the mapping via a second QAM channel.

14. A method comprising:
storing, by a digital device, a mapping of an identification of the digital device to:
a first triggering event with respect to first programmed content of a first media stream accessed on the digital device, and first interactive content related to the first triggering event, and
a second triggering event with respect to second programmed content of a second media stream accessible on the digital device, and second interactive content related to the second triggering event;
detecting, by the digital device, an occurrence of the first triggering event in the first programmed content presented, via the digital device, to a user device for display;
providing, by the digital device, the first interactive content, related to the first triggering event based on the detection of the first triggering event, to the user device for display;
stopping, responsive to receiving user input for switching from the first media stream to the second media stream, the providing of the displayed first interactive content;
detecting, by the digital device, an occurrence of the second triggering event in the second programmed content presented, via the digital device, to the user device for display;
providing, by the digital device responsive to the detection of the second triggering event, the second interactive content to the user device for display;
receiving, by the digital device, a selection of an option with respect to second interactive content;
sending, by the digital device, a request for additional content based on the selection of the option with respect to the second interactive content;
receiving, by the digital device, the additional content; and
providing, by the digital device, the additional content to the user device for display.

15. The method of claim 14, wherein detecting the first triggering event comprises:
identifying triggering event information from the mapping, wherein the triggering event information comprises a time associated with the first triggering event;
monitoring the time with respect to the first media stream accessed on the digital device; and
determining that the first triggering event is occurring when the time corresponds to the triggering event information.

16. The method of claim 14, wherein providing the first interactive content related to the first triggering event comprises:
- identifying the first interactive content based upon the stored mapping;
- sending a request for the first interactive content over the Internet;
- receiving the first interactive content over the Internet; and
- displaying the first interactive content as a replacement or supplement to the first programmed content being displayed by the user device.

17. The method of claim 14, wherein sending the request for additional content comprises:
- storing a mapping of the second interactive content to the additional content;
- identifying the additional content based on the selection of the option with respect to the second interactive content and the mapping of the second interactive content to the additional content; and
- sending a request for the identified additional content.

18. The method of claim 14, further comprising:
- displaying a request for user preferences to provide the first interactive content;
- receiving the user preferences regarding the first interactive content; and
- sending the user preferences regarding the first interactive content and the identification of the digital device to a server, wherein the mapping of the identification of the digital device to the first triggering event and the first interactive content relating to the first triggering event includes using the user preferences to select the first interactive content relating to the first triggering event.

19. The method of claim 14, further comprising:
- receiving the second interactive content related to the second triggering event via an internet protocol (IP) channel when the second triggering event is detected; and
- receiving the additional content as requested via an IP channel responsive to the request for additional content.

20. The method of claim 14, further comprising:
- receiving the mapping of the identification of the digital device to the first triggering event and the first interactive content related to the first triggering event, for storing by the digital device, via a Quadrature Amplitude Modulation (QAM) channel.

\* \* \* \* \*